(12) United States Patent
Appaji

(10) Patent No.: US 8,380,179 B2
(45) Date of Patent: Feb. 19, 2013

(54) SYSTEM AND METHOD FOR LEARNING BASED DEVICE MANAGEMENT

(75) Inventor: Anuradha K Appaji, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1197 days.

(21) Appl. No.: 11/693,799

(22) Filed: Mar. 30, 2007

(65) Prior Publication Data

US 2008/0242286 A1 Oct. 2, 2008

(51) Int. Cl.
*H04M 3/00* (2006.01)
(52) U.S. Cl. ......... 455/418; 455/419; 455/420; 709/224
(58) Field of Classification Search .................. 455/403, 455/405, 418, 419, 420; 709/224
See application file for complete search history.

(56) References Cited

U.S. PATENT DOCUMENTS

| | | | | |
|---|---|---|---|---|
| 2005/0186940 | A1* | 8/2005 | Schatzberger et al. | 455/406 |
| 2006/0025108 | A1* | 2/2006 | Pell et al. | 455/405 |
| 2006/0223495 | A1* | 10/2006 | Cassett et al. | 455/405 |

* cited by examiner

*Primary Examiner* — Nay A Maung
*Assistant Examiner* — Angelica Perez

(57) ABSTRACT

The present disclosure relates generally to systems and methods for learning based device management. In one example, the method includes identifying functions available on a mobile device and determining a usage pattern for each of the functions. A determination is made as to whether each of the functions is to be monitored based on the function's usage pattern, and a device management profile is generated that defines monitoring parameters for each of the functions to be monitored.

21 Claims, 4 Drawing Sheets

SYSTEM AND METHOD FOR LEARNING BASED DEVICE MANAGEMENT

CROSS-REFERENCE TO RELATED APPLICATIONS

This application is related to U.S. patent application Ser. No. 11/610,009, filed on Dec. 13, 2006, and entitled "FRAMEWORK FOR RULE BASED EXECUTION AND SCHEDULING OF TASKS IN MOBILE DEVICES", which claims priority to U.S. Provisional Patent Application No. 60/822,453, entitled "FRAMEWORK FOR RULE BASED EXECUTION AND SCHEDULING OF TASKS IN MOBILE DEVICES", filed on Aug. 15, 2006, both of which are incorporated herein by reference in their entirety.

BACKGROUND

Mobile devices, such as mobile telephones and personal digital assistants, may automatically execute self-diagnostic tasks. For example, a mobile device might collect information on the usage patterns of the mobile device's user, on the mobile device's performance metrics, and on other parameters. A telecommunications service provider that provides services to the mobile device might wish to collect this information. However, many currently implemented monitoring and collection processes lack flexibility, and so an improved system and method for device management are needed.

SUMMARY

In one embodiment, a method comprises identifying a plurality of functions available on a mobile device and determining a usage pattern for each of the plurality of functions. The method further determines whether each of the plurality of functions is to be monitored based on the function's usage pattern. A device management profile is generated that defines at least one monitoring parameter for each of the plurality of functions to be monitored.

In another embodiment, a method comprises obtaining, by a mobile device, usage information corresponding to a plurality of functions on the mobile device. The mobile device monitors at least some of the plurality of functions based on a device management profile defining at least one monitoring parameter corresponding to each of the plurality of functions being monitored, wherein the at least one monitoring parameter is based on the usage information of the corresponding function, and wherein the monitoring obtains data about each of the plurality of functions being monitored. The data is sent to a network in wireless communication with the mobile device.

In yet another embodiment, a mobile device comprises a wireless network interface, a processor coupled to the wireless network interface, a memory coupled to the processor for storing a plurality of instructions executable by the processor, and a plurality of executable instructions. The executable instructions include instructions for obtaining usage information corresponding to a plurality of functions on the mobile device; instructions for monitoring at least some of the plurality of functions based on a device management profile defining at least one monitoring parameter corresponding to each of the plurality of functions being monitored, wherein the at least one monitoring parameter is based on the usage information of the corresponding function, and wherein the monitoring obtains data about each of the plurality of functions being monitored; and instructions for sending the data to a network in wireless communication with the mobile device.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
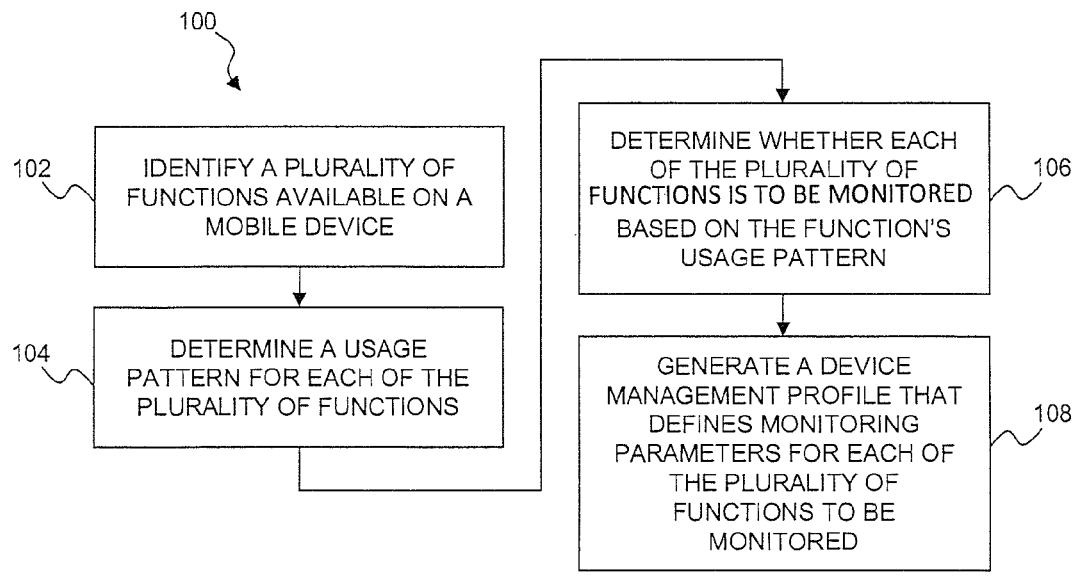
FIG. 1 is a flowchart illustrating one embodiment of a method for generating a device management profile for a mobile device.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 100 may be used to control monitoring activities on a mobile device. Generally, a telecommunications provider may be interested in receiving information about tasks, such as processes or activities, running on their subscribers' mobile devices. All of the data produced by all of the tasks that run on a mobile device might then be transmitted to the provider. This might lead to the provider receiving a great deal of task-related data from the mobile device regardless of whether the provider actually wishes to make use of all of that data. For example, a mobile device user might make the greatest use of the voice communication features of the mobile device and might rarely use other features such as data communication and photography. Tasks related to the rarely used features would still be executed on such a user's mobile device and the results of the tasks would be transmitted to the provider. The provider might be interested only in the voice-related data for such a user, but would still receive information about the rarely used features. The provider might wish to avoid receiving unwanted data by preventing a task from executing when the data generated by the task is not relevant to the provider.

The compilation of information regarding the mobile device, referred to as "device management", may be controlled in various ways. For example, the execution of device management tasks may be controlled using a rule based system, such as that described in detail in previously incorporated U.S. patent application Ser. No. 11/610,009. The method 100 may be used in conjunction with the rule based system of U.S. patent application Ser. No. 11/610,009 or with other systems and processes to aid in determining which functions of a mobile device should be monitored and to generate a device management profile for controlling the monitoring for that particular mobile device based on "learning" the user's use of the mobile device.

Accordingly, in step 102, a plurality of functions available on a mobile device may be identified. For example, the method 100 may identify that the mobile device is able to conduct voice and data communications via one or more protocols, take pictures, listen to music, etc. In the present example, the functions may include only functions that are directly coupled to user activities (e.g., participating in a voice call, transferring data, taking a picture, or listening to music), but it is understood that other functions may be monitored (such as battery usage by the mobile device).

In step 104, a usage pattern for each of the plurality of functions may be determined. The usage pattern for a particular function may include such factors as frequency of use (i.e., how often a particular function is used), time of use (i.e., when during the day or night the function is used), mobility (i.e., whether the user is highly mobile or mainly stationary), and other factors. For example, if the user of the mobile device frequently takes pictures and conducts voice calls, but infrequently listens to music and very infrequently transmits data, then this usage would be noted. Some factors, such as mobility, may be determined separately from a given function or may be determined in relation to a specific function. For example, if the user is highly mobile while talking during business hours but mainly takes pictures when at home in the evening, then this relationship may be noted.

In step 106, a determination may be made as to whether each of the functions is to be monitored based on that function's usage pattern. Whether a particular function is to be monitored may depend on one or more factors, including frequency of use. If monitoring is to be performed on frequency of use, a general threshold may be set (e.g., all functions used over five minutes a day are to be monitored), various levels of frequency use may be set for different functions (e.g., all functions used over five minutes a day that require a certain amount of power are to be monitored, while all functions that use a lesser amount of power are to be monitored only if they are used for over fifteen minutes a day), or each function may have a customized set of rules to determine whether it is to be monitored (e.g., the camera function is to be monitored if the user takes five or more pictures a day or in a one hour time period).

In step 108, a device management profile is generated to control the monitoring of the functions. The device management profile may range from relatively simple to highly detailed depending on the desired level of granularity of the monitoring. For example, the device management profile may define what functions are to be monitored, when the monitoring should occur, how often the monitoring should occur, and/or when the monitoring should be increased, reduced, paused, or re-evaluated.

For example, assume that a user tends to stay up late at night. As such, the user is frequently involved in conference calls from 10:30 PM-1:00 AM to accommodate participants in other countries. During this time, the user typically uses both voice and data functions on her mobile device. Since this appears to be a crucial window of time for the user, the device management profile would ensure that no data management reporting and/or updating activities occur at this time, even though the timeframe would generally be a good data management window for other users. Accordingly, while the device management profile may permit the collection of statistics for voice and data during the 10:30 PM-1:00 AM window, the schedule may ensure that other data management activities such as retrieval, inventory access, software component downloads, etc., are not performed during this window.

In another example, a user may purchase a new mobile device with camera and music functionality, as well as voice and data functionality. Like many new users, the user may frequently use the additional functions (e.g., the camera and music player). Accordingly, the device management profile may designate regular collection and retrieval of data for these functions. However, after a period of time, the user may rarely use the camera or music feature during the hours of 8:00 AM-5:00 PM. Accordingly, as the statistics for the camera and music functions are no longer meaningful during this time frame, the device management profile may be modified so that data is not collected during this time for the camera and music functions. This change saves network bandwidth usage, resource usage on the user's device, and eliminates the need to filter out meaningless data.

If the device management profile is generated on the mobile device itself, the mobile device may then use the device management profile to monitor the functions as defined in the device management profile. If the device management profile is generated by the provider (e.g., not on the mobile device), then the device management profile may be transferred to the mobile device from the network. It is understood that, if the device management profile is generated by the provider, then information regarding the functions (e.g., information needed for steps 102 and/or 104) may be sent to the provider from the mobile device.

Figure 2:
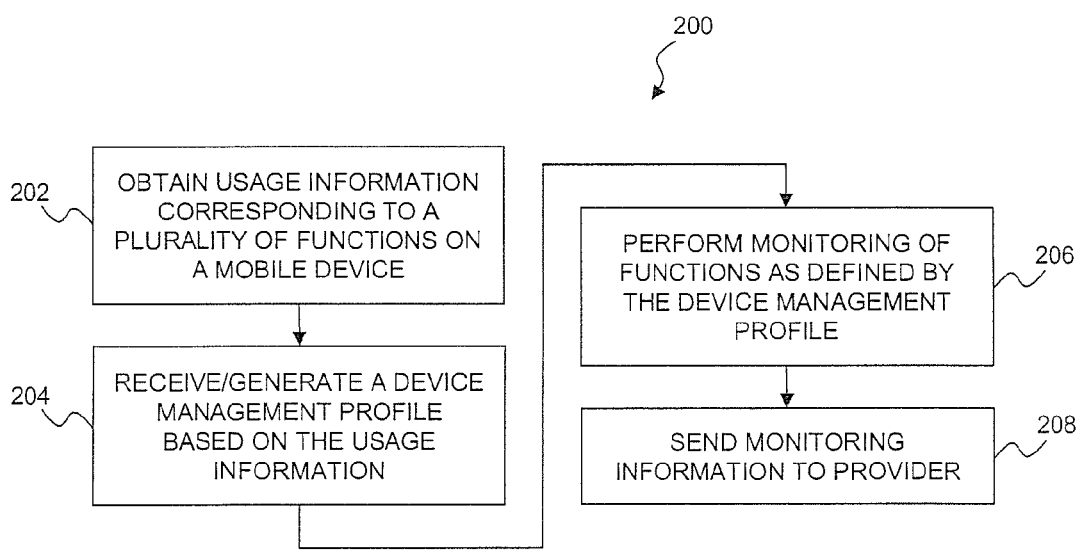
FIG. 2 is a flowchart illustrating one embodiment of a method for device management on a mobile device.

Referring to FIG. 2, a method 200 may be used for device management on a mobile device. For example, the method may be used in conjunction with the method 100 of FIG. 1 to apply a device management profile to functions performed by the mobile device. In step 202, usage information is obtained for functions of the mobile device. In step 204, a device management profile may be generated based on the usage information as described with respect to FIG. 1. The device management profile may be generated by the mobile device itself or may be generated by the provider and sent to the mobile device. In step 206, the mobile device may monitor various functions as defined by the device management profile. As described previously, various parameters may be defined for the monitoring of a particular function, including a monitoring time window and a level of monitoring detail. In step 208, the monitoring information may be sent to the provider for processing and review.

Figure 3:
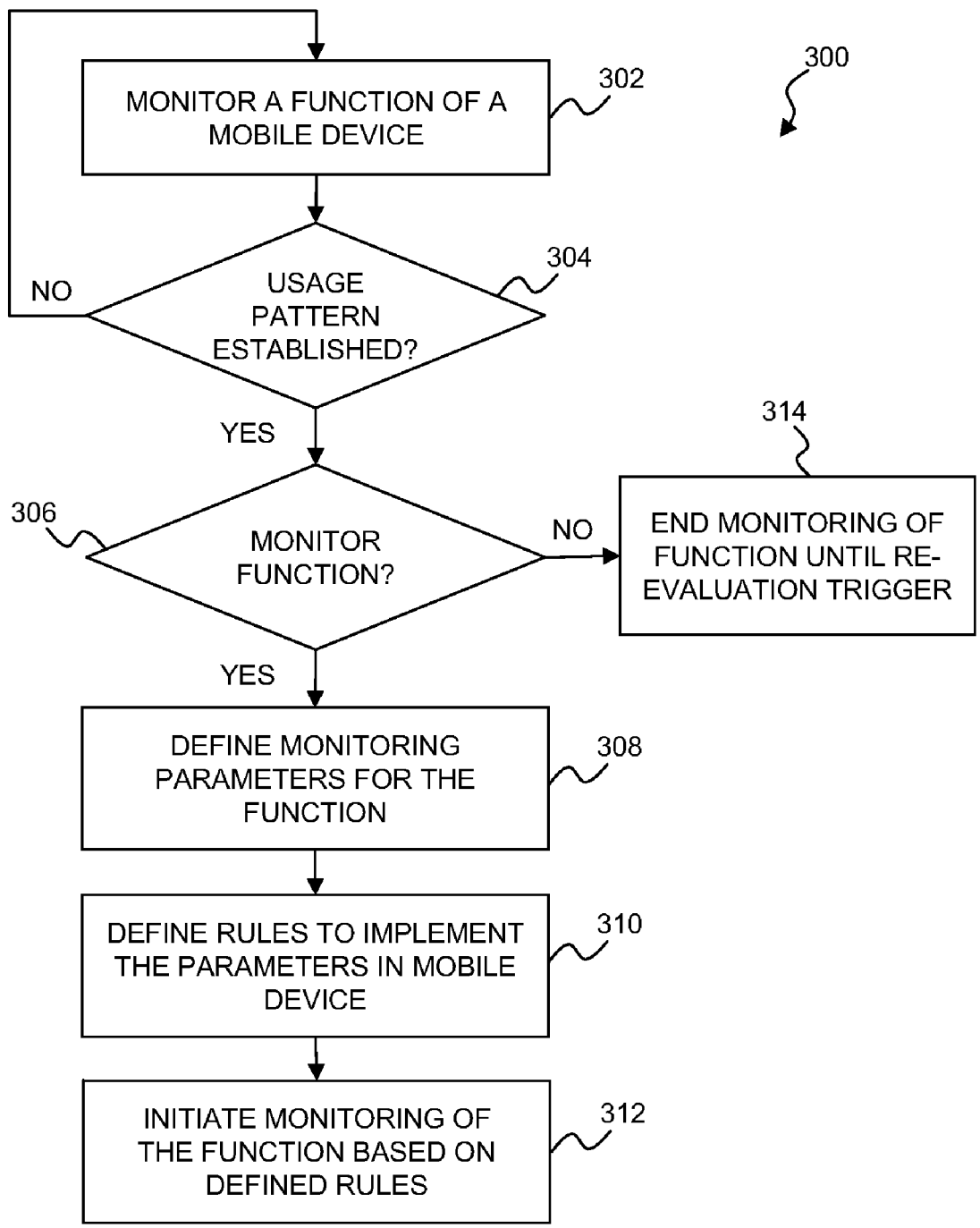
FIG. 3 is a flowchart illustrating another embodiment of a method for generating a device management profile for a mobile device.

Referring to FIG. 3, in another embodiment, a method 300 illustrates a more specific implementation of the generation of a learning based device management profile in a rule based system. For example, the method 300 may be used with the rule based system described in detail in previously incorporated U.S. patent application Ser. No. 11/610,009, although it is understood that the method 300 may be used with many other device management processes. For purposes of convenience, the method 300 is described with respect to a single function in a mobile device. However, the method 300 may be used to generate a device management profile for many different functions.

In step 302, the function of the mobile device is monitored. Continuing the previous example of the user who purchased the new mobile device with camera, music, voice, and data functionality, step 302 may begin after the new mobile device authenticates with the provider network or may begin as soon as the mobile device is powered on. In the present illustration, the function to be monitored is the camera function, and so step 302 begins to monitor the usage of the camera function.

In step 304, a determination may be made as to whether a usage pattern has been established. The criteria for a usage pattern may be based on many different factors, such as use of the function a particular number of times, at a particular time of day, etc. As such a pattern may take time to develop or be noticed, the method 300 may return to step 302 and continue to monitor the camera function on a regular basis. In some embodiments, if usage is erratic and no pattern can be identified, method 300 may continue to loop steps 302 and 304 indefinitely with regular collection and reporting. In other embodiments, if no pattern can be identified and usage is light (e.g., infrequent), the method 300 may stop monitoring the function until a later re-evaluation period. For example, the method 300 may move from step 304 to step 316, although this is not illustrated in FIG. 3.

If a usage pattern is determined to exist in step 304, the method 300 continues to step 306 to determine whether to monitor the function. For example, if the pattern indicates that the user takes approximately five pictures a week at irregular times (e.g., light usage), the method 300 may continue to step 316 and stop monitoring the function until a later re-evaluation period. It is understood that the term "light usage" is relative, and that any pattern may be monitored if desired even if usage of the function is relatively light.

If the function is to be monitored, as determined in step 306, the method 300 continues to step 308, where it defines a plurality of monitoring parameters. Continuing the camera example, after camera usage has stopped during the 8:00 AM-5:00 PM timeframe on weekdays, parameters may be defined to only monitor the camera function on weekdays from 6:00 AM-8:00 AM and from 5:00 PM to 11:30 PM, and on weekends from 8:00 AM to 12 AM.

In step 310, in a rule based system, the method 300 may define one or more rules to implement the defined parameters in the mobile device. As described in detail in previously incorporated U.S. patent application Ser. No. 11/610,009, such rules may be used to control monitoring processes in the mobile device. In step 312, monitoring of the function may begin according to the defined rules.

Although not shown, it is understood that the method 300 may re-evaluate the monitoring of the function. The re-evaluation may be periodic (e.g., after a defined period of time has passed) or may be triggered by the occurrence of an event. For example, if the battery is suddenly drained at a much higher rate than usual for the mobile device, re-evaluation may occur based on this event to determine the cause of the battery drain. For example, if the user of the mobile device has gone on vacation and is using the camera function heavily, the mobile device's battery charge may be drained significantly faster than normal. The re-evaluation may not only attempt to identify the cause of the increased battery drain, but may also attempt to identify other factors (such as the user's location) to determine whether the modified function usage is normal or likely to be temporary. Accordingly, the camera function may be monitored until it returns to "normal" as defined by the parameters, or it may be monitored more heavily based on a new set of parameters until the next re-evaluation period.

Figure 4:
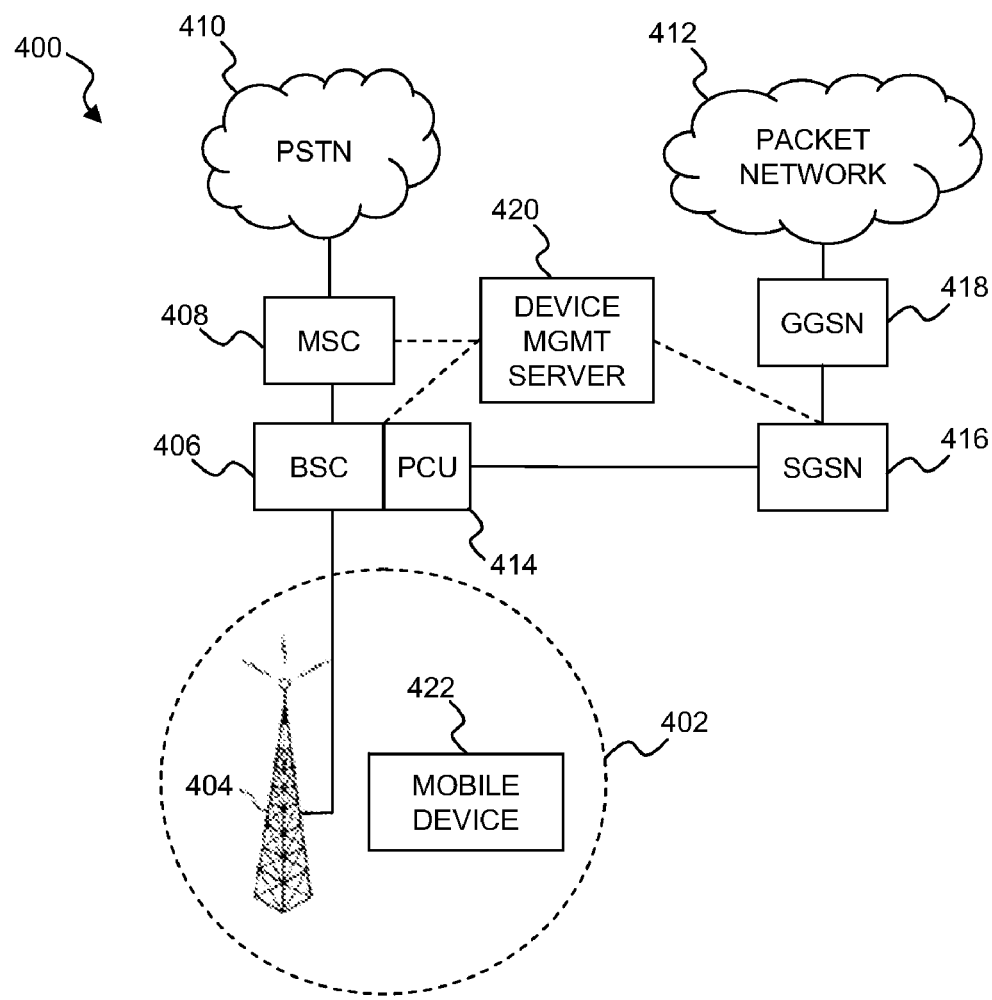
FIG. 4 is a block diagram of one embodiment of a network within which the method of FIG. 1 may be implemented.

Referring to FIG. 4, one embodiment of a portion of a wireless network 400 in which the method 100 of FIG. 1 may be implemented is illustrated. In the present example, the network 400 is based on Global System for Mobile communication (GSM) technology, but it is understood that the present disclosure may be implemented in any wireless network. For example, the present disclosure may be implemented in networks using Code Division Multiple Access (CDMA) technologies (including evolution data-only (EV-DO) architectures) based on Interim Standard 95 (IS-95), Interim Standard 2000 (IS-2000) and Universal Mobile Telecommunications System (UMTS). The network 400 may represent other technologies, including Orthogonal Frequency Division Multiplexing (OFDM). Furthermore, the network 400 may be a packet-based wireless network. Accordingly, it is understood that the methods of the present disclosure may be performed in networks based on different technologies and that the example of a GSM network is for purposes of illustration only.

The network 400 comprises a plurality of cells, such as cell 402. It is understood that the cell may represent any subdivision (e.g., a cell, sector, or other network segment) of a wireless network. In the present example, the network 400 may be connected to other wireless and/or wireline networks, such as Public Switched Telephone Network 410 and packet network 412 (which may be any combination of private and public networks based on any packet technology, such as the Internet Protocol (IP) and the Transport Control Protocol (TCP)). Cell 402 includes base transceiver station (BTS) 404 that is coupled to base station controller (BSC) 406. A mobile switching center (MSC) 408 may be used to connect the network 400 with other networks, such as PSTN 410. Although not shown, the BSC 406 may be coupled to multiple BTSes, and the MSC 408 may be coupled to other BSCs.

The BSC 406 may include or be coupled to a Packet Control Unit (PCU) 414 that may be configured to handle packet data for the BSC and to couple the GSM portion of the network 400 with a General Packet Radio Service (GPRS) portion for data packets. The terms "packet" and "packet data", as used in the present disclosure, may be interchangeable and may include any type of encapsulated data, including datagrams, frames, packets, and the like, and the encapsulated information may include voice, video, data, and/or other encapsulated information. The PCU 414 may be coupled to a Serving GPRS Support Node (SGSN) 416 that is coupled to the packet network 412 via a Gateway GPRS Support Node (GGSN) 418. In the present example, a device management server 420 may be coupled to one or more of the network entities as illustrated.

The device management server 420 may provide usage profile generator and/or device management profile generator functions. As described with respect to the method 100 of FIG. 1, the usage profile generator may identify various usage factors for a mobile device based on monitoring the mobile device's functions. Such factors may include, but are not limited to, whether the user of the mobile device is voice-centric or data-centric, is an audiophile or a photographer, hours of usage (e.g., late at night), whether the user frequently fails to charge the mobile device before the battery dies, whether the user is a frequent commuter who plays games while commuting, etc. In generating a device management profile for the mobile device, the device management profile generator may make determinations as to what aspects of the mobile device are to be monitored (e.g., the camera), when the monitoring is more meaningful, how much monitoring should occur, how long monitoring should continue, how often monitoring should occur, when to increase, decrease, or pause monitoring, etc.

The usage profile generator and/or device management profile generator functions may aid in tailoring device management activities to the needs of each mobile device user. Such tailoring avoids the approach of monitoring virtually every activity and may optimize the size of the device management object tree footprint by reducing it to cover only needed monitoring. The monitoring of selected activities prevents the collection of large amount of possibly irrelevant data, thereby minimizing database requirements and management, and reducing the use of over the air bandwidth and device resources. Furthermore, network resources may be maximized and the amount of data that the provider obtains for review can be filtered at the source (i.e., the mobile device) rather than at the provider.

The device management server 420 may be compliant with standards such as those specified by the Open Mobile Alliance (OMA), which has developed a device management framework for telecommunications services. If OMA compliant, the device management server 420 may be referred to as a "Management Authority" server. In other embodiments, functionality provided by the device management server 420 may be included in an existing network entity, such as the BSC 406 or MSC 408. In still other embodiments, functionality provided by the device management server 420 may be distributed among multiple network components.

A mobile device 422 may communicate with the network 400 via the BTS 404 when positioned in the cell 402 (or in another cell associated with the network 400). In the present example, the mobile device 422 is a mobile telephone, but it is understood that the mobile device may be any device capable of wirelessly communicating with a network, and such devices may include personal digital assistants, personal computers (e.g., laptops), and/or pagers.

Although not shown, it is understood that some or all entities of the network 400 may include one or more processors, memories, and other components that enable the entities to receive, store, retrieve, process, and transmit instructions and data over wireless and/or wireline communication links. Furthermore, at least some functionality of an entity may be distributed and located elsewhere, either within a cell or outside of a cell. Repeaters (not shown) may be used to extend the range of the BTS 404.

Figure 5:
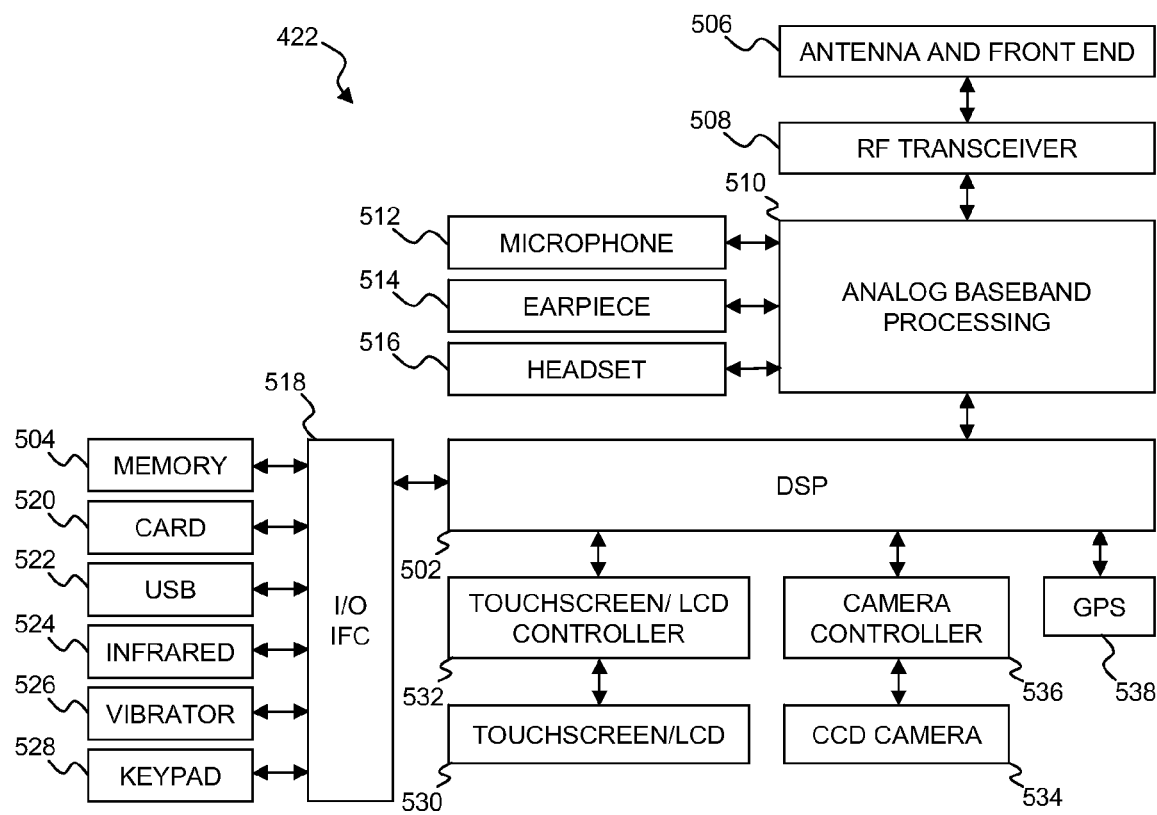
FIG. 5 is a block diagram of one embodiment of a mobile device that may be used within the network of FIG. 4.

With additional reference to FIG. 5, a block diagram illustrates one embodiment of the mobile device 422 of FIG. 4 in greater detail. The mobile device 422 includes a digital signal processor (DSP) 502 and a memory 504. As shown, the mobile device 422 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the mobile device 422 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 422 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the mobile device 422 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the mobile device 422 to function as a peripheral device to exchange information with a personal computer or other computer system. The infrared port 524 and other optional ports such as a Bluetooth interface or an IEEE 802.11 compliant wireless interface may enable the mobile device 422 to communicate wirelessly with other nearby mobile devices and/or wireless base stations.

The input/output interface 518 may further connect the DSP 502 to the vibrator 526 that, when triggered, causes the mobile device 422 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 422. Another input mechanism may be the touch screen LCD 530, which may also display text and/or graphics to the user. The touch screen LCD controller 532 couples the DSP 502 to the touch screen LCD 530.

The CCD camera 534 enables the mobile device 422 to take digital pictures. The DSP 502 communicates with the CCD camera 534 via the camera controller 536. The GPS sensor 538 is coupled to the DSP 502 to decode global positioning system signals, thereby enabling the mobile device 422 to determine its position. Various other peripherals may also be included to provide additional functions, e.g., radio and television reception.

It is understood that the mobile device 422 may include a plurality of executable instructions, including instructions for device management. Accordingly, various aspects of the methods of the preceding embodiments may be executed by the mobile device 422.

Although only a few exemplary embodiments of this disclosure have been described in details above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. Accordingly, all such modifications are intended to be included within the scope of this disclosure.

What is claimed is:

1. A method comprising:
obtaining, by a mobile device, usage information corresponding to a plurality of functions on the mobile device;
monitoring, by the mobile device, a subset of the plurality of functions based on a device management profile defining at least one monitoring parameter corresponding to each of the plurality of functions being monitored, wherein the at least one monitoring parameter is selected according to the usage information of the corresponding function;
obtaining data, by the mobile device, about each of the subset of functions being monitored; and
sending the obtained data relating to the subset of functions being monitored to a network in wireless communication with the mobile device without sending data relating to one of the plurality of functions not included within the subset.

2. The method of claim 1, further comprising receiving, by the mobile device, the device management profile from the network.

3. The method of claim 1, further comprising generating, by the mobile device, the device management profile.

4. The method of claim 1, further comprising re-evaluating the device management profile to determine whether the device management profile needs to be modified.

5. The method of claim 1, further comprising executing, by the mobile device, a plurality of rules on the mobile device to control the monitoring, wherein the rules are based on the monitoring parameters for the plurality of functions.

6. The method of claim 1, wherein at least one of the functions comprises a user activity.

7. The method of claim 6, wherein the user activity comprises at least one of participation in a voice call, transferring data, taking a picture, and listening to music.

8. A mobile device comprising a wireless network interface;
a processor coupled to the wireless network interface;
a memory coupled to the processor configured to store a plurality of instructions executable by the processor; and
a plurality of executable instructions including instructions configured to:
obtain usage information corresponding to a plurality of functions on the mobile device;
monitor a subset of the plurality of functions based on a device management profile defining at least one monitoring parameter corresponding to each of the plurality of functions being monitored, wherein the at least one monitoring parameter is selected according to the usage information of the corresponding function;
obtain data, by the mobile device, about each of the subset of functions being monitored; and
send the obtained data relating to the subset of functions being monitored to a network in wireless communication with the mobile device without sending data relating to one of the plurality of functions not included within the subset.

9. The mobile device of claim 8, wherein the instructions further include instructions configured to receive the device management profile from the network.

10. The mobile device of claim 8, wherein the instructions further include instructions configured to generate the device management profile.

11. The mobile device of claim 8, wherein the instructions further include instructions configured to execute a plurality of rules on the mobile device to control the monitoring, wherein the rules are based on the monitoring parameters for the plurality of functions.

12. The mobile device of claim 8, wherein at least one of the functions comprises a user activity.

13. The mobile device of claim 12, wherein the user activity comprises at least one of participation in a voice call, transferring data, taking a picture, and listening to music.

14. An apparatus comprising:
a mobile device configured to:
obtain usage information corresponding to a plurality of functions on the mobile device;
monitor a subset of the plurality of functions based on a device management profile defining at least one monitoring parameter corresponding to each of the plurality of functions being monitored, wherein the at least one monitoring parameter is selected according to the usage information of the corresponding function;
obtain data about each of the subset of functions being monitored; and
send the obtained data relating to the subset of functions being monitored to a network in wireless communication with the mobile device without sending data relating to one of the plurality of functions not included within the subset.

15. The apparatus of claim 14, wherein the mobile device is configured to execute a plurality of rules on the mobile device to control the monitoring, wherein the rules are based on the monitoring parameters for the plurality of functions.

16. The apparatus of claim 14, wherein the mobile device is configured to receive the device management profile from the network.

17. The apparatus of claim 14, wherein the mobile device is configured to generate the device management profile.

18. The apparatus of claim 14, wherein the mobile device is configured to re-evaluate the device management profile to determine whether the device management profile needs to be modified.

19. The apparatus of claim 14, wherein at least one of the functions comprises a user activity.

20. The apparatus of claim 19, wherein the user activity comprises at least one of participation in a voice call, transferring data, taking a picture, and listening to music.

21. The apparatus of claim 14, wherein at least one of the functions comprises an operating characteristic of the mobile device.

* * * * *